(12) United States Patent
Vosburgh

(10) Patent No.: US 7,472,554 B2
(45) Date of Patent: Jan. 6, 2009

(54) PASSENGER ENVIRONMENTAL PROTECTION

(75) Inventor: Keith A. Vosburgh, Waterford, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 532 days.

(21) Appl. No.: 11/058,142

(22) Filed: Feb. 14, 2005

(65) Prior Publication Data

US 2006/0179853 A1 Aug. 17, 2006

(51) Int. Cl.
F25B 49/00 (2006.01)
B60H 1/32 (2006.01)
B60Q 1/00 (2006.01)

(52) U.S. Cl. .................. 62/126; 62/244; 340/438; 340/449; 236/94; 701/45

(58) Field of Classification Search .......... 340/438, 340/449, 573.1, 584; 701/45; 62/126, 244; 236/94

See application file for complete search history.

(56) References Cited

U.S. PATENT DOCUMENTS

| | | | |
|---|---|---|---|
| 4,742,761 A * | 5/1988 | Horstman | 454/74 |
| 6,642,838 B1 * | 11/2003 | Barnas et al. | 340/425.5 |
| 6,922,622 B2 * | 7/2005 | Dulin et al. | 701/45 |
| 2002/0080014 A1 * | 6/2002 | McCarthy et al. | 340/426 |
| 2002/0145516 A1 * | 10/2002 | Moskowitz et al. | 340/522 |
| 2003/0222775 A1 * | 12/2003 | Rackham et al. | 340/457 |
| 2004/0113797 A1 * | 6/2004 | Osborne | 340/573.4 |
| 2004/0155783 A1 * | 8/2004 | Al-Sheikh | 340/584 |
| 2005/0024188 A1 * | 2/2005 | Sider | 340/425.5 |
| 2005/0038582 A1 * | 2/2005 | Arndt et al. | 701/29 |
| 2005/0134441 A1 * | 6/2005 | Somuah | 340/435 |
| 2005/0197792 A1 * | 9/2005 | Haeuptle | 702/66 |
| 2005/0230096 A1 * | 10/2005 | Yamaoka | 165/202 |
| 2006/0033613 A1 * | 2/2006 | Reece | 340/457 |
| 2007/0013531 A1 * | 1/2007 | Hules et al. | 340/584 |

OTHER PUBLICATIONS

Article, "Hot Dog Tech—Can the Hotdog save man's best friend?", Becky Worley, Tech Live, posted Jul. 5, 2002.
Heat Exposure In An Enclosed Automobile, Janet Vandenabeele, The Detroit News, Oct. 20, 2004.
Securecar Heartbeat Sensor Helps to Avert Potential Tragedies, media.ford.com article, Oct. 20, 2004.

* cited by examiner

Primary Examiner—Marc E Norman
(74) Attorney, Agent, or Firm—Brinks Hofer Gilson & Lione

(57) ABSTRACT

The system includes a carbon dioxide sensor, a temperature sensor and a controller. The carbon dioxide sensor is in electrical communication with the controller and generates a carbon dioxide signal indicative of the carbon dioxide level contained in the air within the vehicle cabin. The temperature sensor is also in electrical communication with the controller and generates a temperature signal indicative of the temperature within the vehicle cabin. The controller is configured to initiate a safety precaution based on the carbon dioxide signal and the temperature signal.

15 Claims, 2 Drawing Sheets

PASSENGER ENVIRONMENTAL PROTECTION

BACKGROUND

1. Field of the Invention

The present invention generally relates to a passenger protection system.

2. Description of Related Art

Every year many children and animals suffer because they are left in a motor vehicle unattended. Often, the temperature inside a vehicle can change dramatically when the vehicle is parked. For example, during the summer months a vehicle may have an in-cabin temperature of 75° F. when driven, even though the external temperature is 100° F., due to environmental controls. However, when the vehicle is turned off, the cabin temperature can approach the external temperature within 15 minutes or less. Further, if the vehicle is parked in direct sunlight, the cabin temperature of the vehicle can easily exceed the outside temperature due to the "green house" effect.

In addition, as automotive technology has progressed, the cost and availability of various sensing technologies have improved, making systems to determine if a person is located in the vehicle more viable. Further, connectivity between automotive system controllers and peripheral systems has also improved. Once the system controller uses sensors to determine a person is in the vehicle and that the environmental conditions are dangerous to the person, the increased connectivity allows the controller to take safety precautions not previously available to automotive systems.

In view of the above, it is apparent that there exists a need for a passenger protection system that automatically initiates safety precautions caused by dangerous temperature conditions of an occupied motor vehicle.

SUMMARY

In satisfying the above need, as well as, overcoming the enumerated drawbacks and other limitations of the related art, the present invention provides a passenger protection system that automatically detects if a passenger is in environmental danger and initiates safety precautions.

The system according to this invention includes a carbon dioxide sensor, a temperature sensor and a controller. The carbon dioxide sensor is in electrical communication with the controller and generates a carbon dioxide signal indicative of the carbon dioxide level contained in the air within the vehicle cabin. The temperature sensor is also in electrical communication with the controller and generates a temperature signal indicative of the temperature within the vehicle cabin. The controller is configured to initiate a safety precaution based on the carbon dioxide signal and the temperature signal.

Generally, the carbon dioxide signal may be used to determine if a person or animal is in the vehicle cabin. Further, the system may also include a motion sensor that can verify the presence of a person inside the vehicle cabin. The temperature signal is used to determine if a dangerous environmental condition exists within the vehicle cabin. The controller may compare the temperature signal to a number of predefined thresholds and the controller may initiate a variety of safety precautions based on each of the predefined thresholds. The safety precautions may include controlling a window actuator to open one or more windows, controlling a door actuator, actuating a horn, sending a message to a two-way key communication device, or sending a message to a mobile communication system.

Further objects, features and advantages of this invention will become readily apparent to persons skilled in the art after a review of the following description, with reference to the drawings and claims that are appended to and form a part of this specification.

DETAILED DESCRIPTION

Figure 1:
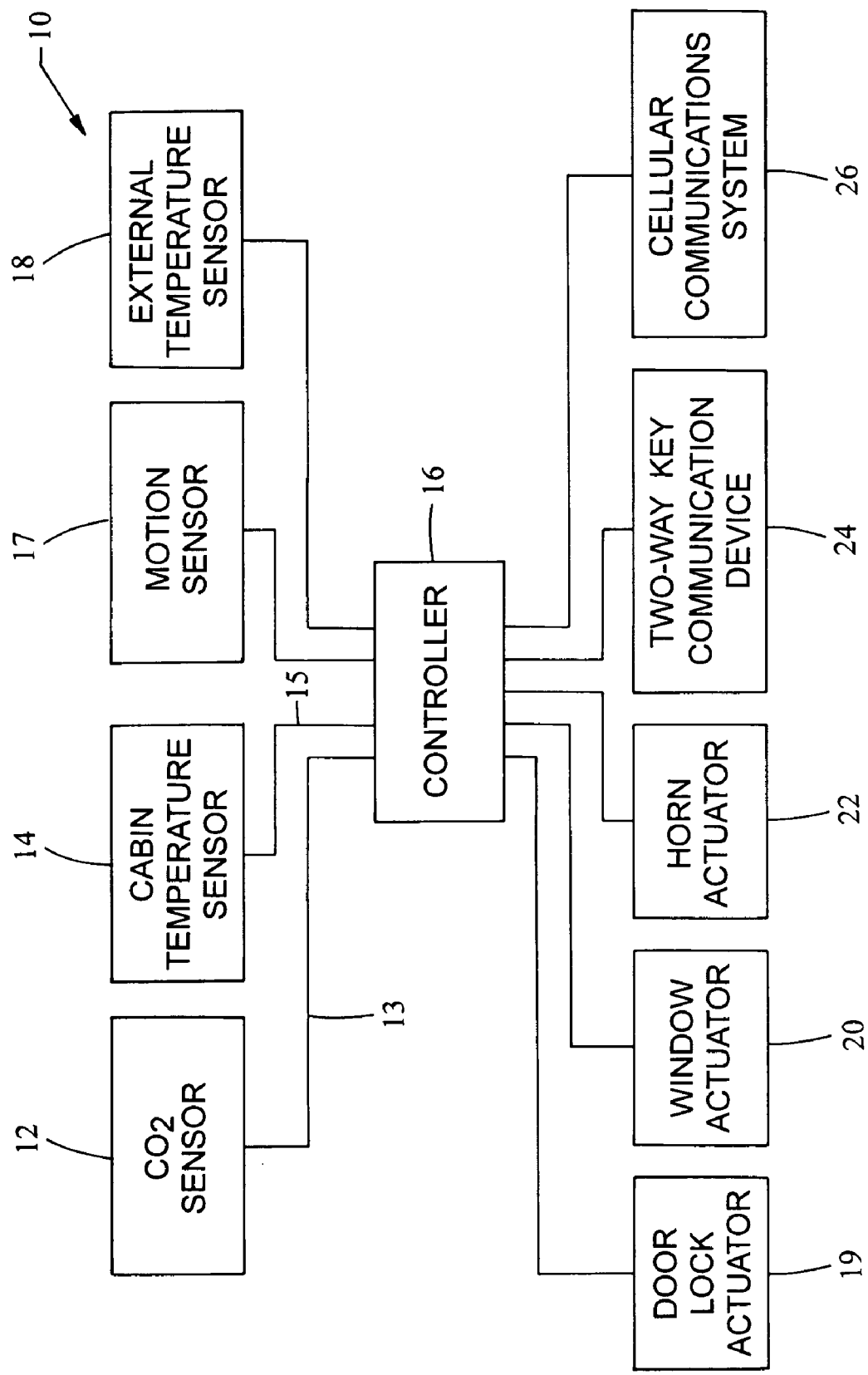
FIG. 1 is a diagrammatic view of a passenger protection system in accordance with the present invention.

Referring now to FIG. 1, a passenger cabin environmental protection system embodying the principles of the present invention is illustrated therein and designated at 10. As its primary components, the passenger protection system 10 includes a carbon dioxide sensor 12, a temperature sensor 14, and a controller 16.

The controller 16 is in electrical communication with a carbon dioxide sensor 12 and a temperature sensor 14. The carbon dioxide sensor 12 generates a carbon dioxide signal 13 indicating an amount of carbon dioxide contained by air inside the vehicle cabin. A temperature sensor 14 generates a temperature signal 15 indicating the temperature of the air inside the vehicle cabin. The controller 16 receives the carbon dioxide signal 13 to determine if a person or animal is located within the vehicle cabin. In addition, the controller 16 determines if the environmental conditions within the cabin may be harmful to the person or animal inside the cabin based on the temperature signal 15. If the controller 16 determines the environment may be dangerous, the controller 16 initiates safety precautions to protect the person or animal based on the carbon dioxide signal 13 and temperature signal 15. Further, the controller 16 may also use a signal from a motion sensor 17 or other sensor type including a weight sensor in the seat, or sound sensor in the cabin to verify if a person is in the vehicle. Further, the controller 16 may use an external temperature sensor 18 to verify if the environment is dangerous.

The controller 16 is in communication with a door lock actuator 19 and is configured to unlock the vehicle if the controller 16 determines a person is present and a dangerous condition exists. Unlocking the vehicle allows a person inside the vehicle to exit or a person external to the vehicle to enter the vehicle helping the person or animal in the cabin. Similarly, the controller 16 is in communication with a window actuator 20 to open one or more windows. If the controller 16 determines a person is present in the cabin and a dangerous environmental condition exists, the controller 16 opens the windows thereby allowing additional ventilation and potentially providing an entrance or exit to the vehicle.

The controller 16 is also in communication with the vehicle horn actuator 22, allowing the controller 16 to actuate a horn for alerting persons external to the vehicle of the potential danger. Once persons are alerted to the danger, help can be provided to the person or animal inside the car. In addition, controller 16 is in communication with a two-way key communication device 24. The two-way key communication device 24 is a short range transmitter and receiver attached to the key of the vehicle allowing the driver to communicate with the vehicle systems. The controller 16 can provide a message to the two-way key communication device 24 warning of potential danger to the person in the vehicle and also providing statistical information such as the vehicle cabin temperature. Similarly, the controller 16 is in electrical communication with a cellular communication system 26. The cellular communication system 26 may be similar to a cellular phone or may connect to a remote service provider such as Onstar™. The cellular communication system 26 can transmit statistical information such as temperature, carbon dioxide level, and the amount of time the car has been closed.

Further, the system may have a button in communication with the controller 16. The button is located in the cabin and configured to operate a safety precaution, such as opening the windows, or any of the other safety precautions mentioned herein, when the cabin temperature is above a temperature threshold, and the controller 16 determines a person or animal is in the vehicle. In addition, the system may be configured to operate only when the vehicle is parked or only when the vehicle is turned off.

The carbon dioxide sensor 12 is used to determine if a person is located in the vehicle. As humans or animals breathe air, their body uses oxygen out of the air and releases carbon dioxide into the environment. The controller 16 receives a carbon dioxide signal 13 from the carbon dioxide sensor 12 when the vehicle doors are closed. A carbon dioxide measurement is stored when the vehicle doors are closed and used as a baseline carbon dioxide value. At the same time, the vehicle cabin temperature is recorded by the temperature sensor 14 and stored as a baseline cabin temperature value, and an external vehicle temperature is stored if available. Generally the carbon dioxide sensor 12 will be placed proximate the floor of the vehicle since carbon dioxide is heavier than air and will accumulate near the floor of the vehicle. As time passes, the controller 16 monitors the carbon dioxide signal 13 and the temperature signal 15 periodically. The controller 16 compares the measured carbon dioxide value to the baseline carbon dioxide value. If the measured carbon dioxide value changes relative to the baseline carbon dioxide value by more than a predefined relationship or threshold the controller 16 will determine a person is located in the vehicle. To preserve power, if the carbon dioxide measurements do not change for a period of time, the system will consider the vehicle unoccupied and revert to a sleep state.

If the controller 16 determines a person or animal is located in the vehicle, the controller 16 will compare the vehicle cabin temperature to a predefined temperature threshold. If the cabin temperature exceeds the predefined temperature threshold, the controller initiates a first safety precaution, such as, beeping the horn to alert the vehicle owner. The controller 16 continues to monitor the temperature after initiation of the first safety precaution. If the temperature continues to rise, the controller compares the cabin temperature to a second predefined temperature threshold. If the temperature exceeds the second predefined temperature threshold, the controller initiates additional safety precautions that may include opening the vehicle windows and unlocking the vehicle doors, while continuing to beep the horn. Further, additional temperature thresholds may implement additional safety precautions including transmitting a signal to a short range device such as a two-way key communication device or to a mobile communication system, such as, a cellular phone, pager device, or a mobile service provider such as Onstar™.

Figure 2:
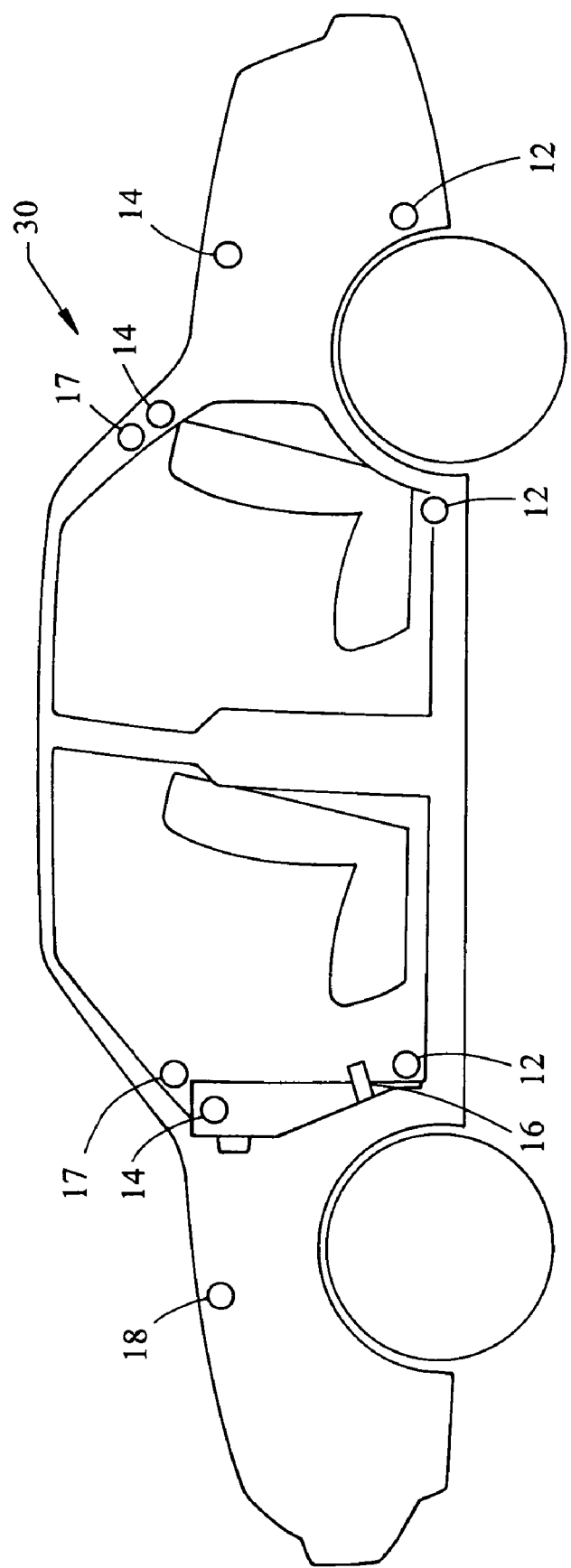
FIG. 2 is a side cutaway view of a vehicle showing placement of the carbon dioxide and temperature sensors.

Now referring to FIG. 2, a cutaway side view of a vehicle is provided showing an example of the placement of the sensors. Generally, the carbon dioxide sensors 12 are located proximate the floor of the vehicle, as carbon dioxide accumulates towards the bottom of the cabin. Therefore, the carbon dioxide sensor 12 may be placed underneath the instrument panel, or a seat in the cabin. The cabin temperature sensor may be located towards the top of the cabin thereby approximating the worst case temperature condition in the cabin. The motion sensor 17 is generally located at the top of the cabin having an obstruction free path to the vehicle seats. The external temperature sensor 18 may be located in the engine compartment or elsewhere external to the vehicle cabin, such that the external temperature may be sensed. Further, the carbon dioxide sensor 12 and the temperature sensor 14 may be located in a storage compartment of the vehicle such as the trunk to sense a person that may be trapped in the trunk of the vehicle. Further, the controller 16 may unlock the trunk in accordance with the principles described above.

As a person skilled in the art will readily appreciate, the above description is meant as an illustration of implementation of the principles of this invention. This description is not intended to limit the scope or application of this invention in that the invention is susceptible to modification, variation and change, without departing from spirit of this invention, as defined in the following claims.

I claim:

1. A passenger cabin environmental protection system for a vehicle, the passenger protection system comprising:
   a carbon dioxide sensor for generating a carbon dioxide signal;
   a cabin temperature sensor for generating a temperature signal; and
   a controller in electrical communication with the carbon dioxide sensor and the temperature sensor, the controller being configured to initiate a safety precaution based on the carbon dioxide signal and the temperature signal;
   a motion sensor for generating a motion signal;
   wherein the controller is configured to determine a person is located in the vehicle based on the carbon dioxide signal and the motion signal;
   wherein the controller is configured to initiate a plurality of safely precautions, each safety precaution being initiated based on one of a plurality of predetermined temperature thresholds.

2. The passenger cabin environmental protection system according to claim 1, wherein the controller is configured to initiate the safety precaution when the temperature signal exceeds a predefined threshold.

3. The passenger cabin environmental protection system according to claim 2, wherein the controller is in electrical communication with a window actuator and the safety precaution includes controlling the window actuator.

4. The passenger cabin environmental protection system according to claim 2, wherein the controller is in electrical communication with a door lock actuator and the safety precaution includes controlling the door lock actuator.

5. The passenger cabin environmental protection system according to claim 2, wherein the controller is in electrical communication with a horn actuator and the safety precaution includes controlling the horn actuator.

6. The passenger cabin environmental protection system according to claim 2, wherein the controller is in electrical communication with a key communication device and the safety precaution includes controlling the key communication device.

7. The passenger cabin environmental protection system according to claim 2, wherein the controller is in electrical communication with a mobile communication system and the safety precaution include controlling the mobile communication system.

8. The passenger cabin environmental protection system according to claim 1, further comprising an external temperature sensor, the external temperature sensor being in electrical communication with the controller to verify a dangerous environmental condition exists.

9. A passenger cabin environmental protection system for a vehicle having a vehicle cabin, the passenger protection system comprising:
- a first sensor to generate a first signal indicative of a person being present in the vehicle;
- a second sensor to generate a second signal indicative of a dangerous environmental condition; and
- a controller in electrical communication with the first and second sensor, the controller configured to initiate a plurality of safety precautions, each safety precaution being initiated based on one of a plurality of predetermined temperature thresholds.

10. The passenger cabin environmental protection system according to claim 9, wherein the carbon dioxide sensor is located proximate a floor of the vehicle.

11. The passenger cabin environmental protection system according to claim 9, wherein the controller is in electrical communication with a window actuator and the safety precaution includes controlling the window actuator.

12. The passenger cabin environmental protection system according to claim 9, wherein the controller is in electrical communication with a door lock actuator and the safety precaution includes controlling the door lock actuator.

13. The passenger cabin environmental protection system according to claim 9, wherein the controller is in electrical communication with a horn actuator and the safety precaution includes controlling the horn actuator.

14. The passenger cabin environmental protection system according to claim 9, wherein the controller is in electrical communication with a key communication device and the safety precaution includes controlling the key communication device.

15. The passenger cabin environmental protection system according to claim 9, wherein the controller is in electrical communication with a mobile communication system and the safety precaution includes controlling the mobile communication system.

* * * * *